United States Patent
Mann et al.

(10) Patent No.: US 8,755,409 B2
(45) Date of Patent: Jun. 17, 2014

(54) PROCESSING MESSAGES WITH INCOMPLETE PRIMARY IDENTIFICATION INFORMATION

(75) Inventors: Robert A. Mann, Ottawa (CA); Darryl W. Jaakkola, Carp (CA); Laurent Potiez, Ottawa (CA)

(73) Assignee: Alcatel Lucent, Paris (FR)

( * ) Notice: Subject to any disclaimer, the term of this patent is extended or adjusted under 35 U.S.C. 154(b) by 321 days.

(21) Appl. No.: 13/273,686

(22) Filed: Oct. 14, 2011

(65) Prior Publication Data
US 2013/0094519 A1   Apr. 18, 2013

(51) Int. Cl.
*H04J 3/24*   (2006.01)

(52) U.S. Cl.
USPC .......................................................... 370/475

(58) Field of Classification Search
USPC .......................................................... 370/475
See application file for complete search history.

(56) References Cited

U.S. PATENT DOCUMENTS

| 2004/0082332 A1* | 4/2004 | McCann et al. ............... 455/445 |
| 2011/0182206 A1* | 7/2011 | Cherian et al. ................ 370/254 |

* cited by examiner

*Primary Examiner* — Sulaiman Nooristany
(74) *Attorney, Agent, or Firm* — Kramer & Amado, P.C.

(57) ABSTRACT

Various exemplary embodiments relate to a method and related network node including one or more of the following: receiving, at the network device, a message associated with an entity; determining that the message lacks at least one primary identification value used to identify the entity associated with the message; extracting at least one secondary identification value from the message; selecting a correlation rule of a plurality of correlation rules that matches the at least one secondary identification value, wherein each correlation rule of the plurality of correlation rules identifies a mapping between secondary identification values and primary identification values; identifying the at least one primary identification value based on the selected correlation; identifying the entity based on the at least one primary identification value.

17 Claims, 6 Drawing Sheets

| Criteria | Result |
|---|---|
| {Origin-Host=0x3F; Origin-Realm=0x64; AF-Application-Identifier=0x4E} | {APN=0x4} |
| {Origin-Host=0x5D; Origin-Realm=0x63; AF-Application-Identifier=0x82} | {APN=0x7} |
| ... | ... |
| {Origin-Realm=0x46; AF-Application-Identifier=0x71} | {APN=0x1} |
| {Origin-Realm=0x5F; AF-Application-Identifier=0x2C} | {APN=0x3} |
| ... | ... |
| {AF-Application-Identifier=0x71} | {APN=0xF} |
| {AF-Application-Identifier=0x82} | {APN=0x7} |
| ... | ... |
| {Origin-Realm=0x63} | {APN=0xA} |
| {Origin-Realm=0x46} | {APN=0xA} |
| ... | ... |
| {Origin-Host=0x56, Origin-Realm=0x46} | {APN=0x2} |
| {Origin-Host=0x3F, Origin-Realm=0x3C} | {APN=0x7} |
| ... | ... |

FIG. 7

PROCESSING MESSAGES WITH INCOMPLETE PRIMARY IDENTIFICATION INFORMATION

CROSS-REFERENCE TO RELATED APPLICATIONS

This application cross-references the following co-pending application, incorporated by reference herein, in its entirety: application Ser. No. 13/273,853, and "Processing Messages Correlated to Multiple Potential Entities" to Mann et al.

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for processing a message having incomplete primary identification information, the method including one or more of the following: receiving, at the network device, a message associated with an entity; determining that the message lacks at least one primary identification value used to identify the entity associated with the message; extracting at least one secondary identification value from the message; selecting a correlation rule of a plurality of correlation rules that matches the at least one secondary identification value, wherein each correlation rule of the plurality of correlation rules identifies a mapping between secondary identification values and primary identification values; identifying the at least one primary identification value based on the selected correlation; identifying the entity based on the at least one primary identification value.

Various exemplary embodiments relate to a network device for processing a message having incomplete primary identification information, the network device including one or more of the following: an attribute-value pair (AVP) extractor configured to extract at least one secondary identification AVP from a message received by the network device; an correlation rules storage that stores a plurality of correlation rules, wherein each correlation rule of the plurality of correlation rules includes a criteria and a result; a rules engine configured to select a correlation rule including a criteria that matches at least one value carried by the at least one secondary identification AVP; and a result reporter configured to report to at least one other component of the network device the result of the selected correlation rule.

Various exemplary embodiments relate to a tangible and non-transitory machine-readable storage medium encoded with instructions for execution by a network device for processing a message having incomplete primary identification information, the tangible and non-transitory machine-readable storage medium including one or more of the following: instructions for receiving, at the network device, a message associated with an entity; instructions for determining that the message lacks at least one primary identification value used to identify the entity associated with the message; instructions for extracting at least one secondary identification value from the message; instructions for selecting a correlation rule of a plurality of correlation rules that matches the at least one secondary identification value, wherein each correlation rule of the plurality of correlation rules identifies a mapping between secondary identification values and primary identification values; instructions for identifying the at least one primary identification value based on the selected correlation; instructions for identifying the entity based on the at least one primary identification value.

Various embodiments are described wherein: the at least one primary identification value includes an access point name (APN); and the at least one secondary identification value includes at least one of an origin host value, an origin realm value, and an application function (AF) application identifier.

Various embodiments are described wherein: the at least one secondary identification value includes a plurality of secondary identification values; at least two correlation rules of the plurality of correlation rules each match the plurality of secondary identification values; and the step of selecting a correlation rule of a plurality of correlation rules includes selecting a correlation rule of the plurality of correlation rules that matches a most specific combination of the plurality of secondary values.

Various embodiments are described wherein the plurality of correlation rules is at least partially ordered and the step of selecting a correlation rule of a plurality of correlation rules includes; iterating through the plurality of correlation rules based on the at least partial order; selecting a first correlation that matches the at least one secondary identification value.

Various embodiments are described wherein: the at least one secondary identification value includes a plurality of secondary identification values; each correlation rule of the plurality of correlation rules specifies at least one criteria value; each correlation matches the plurality of secondary identification values if each criteria value of the at least one criteria value specified by the correlation matches at least one secondary identification value of the plurality of secondary identification values; and the at least partial order of the plurality of correlation rules is based on a specificity of the at least one criteria value specified by each correlation of the plurality of correlations.

Various embodiments further include transmitting, to at least one other network device, an indication of the entity associated with the message.

Various embodiments are described wherein the entity associated with the message includes at least one of a subscriber and an IP-CAN session.

Various embodiments further include a policy and charging rules node (PCRN) blade identification module that determines an appropriate PCRN blade to process the message based on the result of the selected correlation rule; and a message router that forwards the message to the appropriate PCRN blade.

Various embodiments further include an entity identification module that identifies an entity associated with the message based on the result of the selected correlation rule, wherein the entity includes at least one of a subscriber and an IP-CAN session.

Various embodiments further include a message router configured to transmit an indication of the entity to at least one other network device.

BRIEF DESCRIPTION OF THE DRAWINGS

In order to better understand various exemplary embodiments, reference is made to the accompanying drawings, wherein:

FIG. 7 illustrates an exemplary correlation rule set; and

To facilitate understanding, identical reference numerals have been used to designate elements having substantially the same or similar structure and/or substantially the same or similar function.

DETAILED DESCRIPTION

Figure 1:
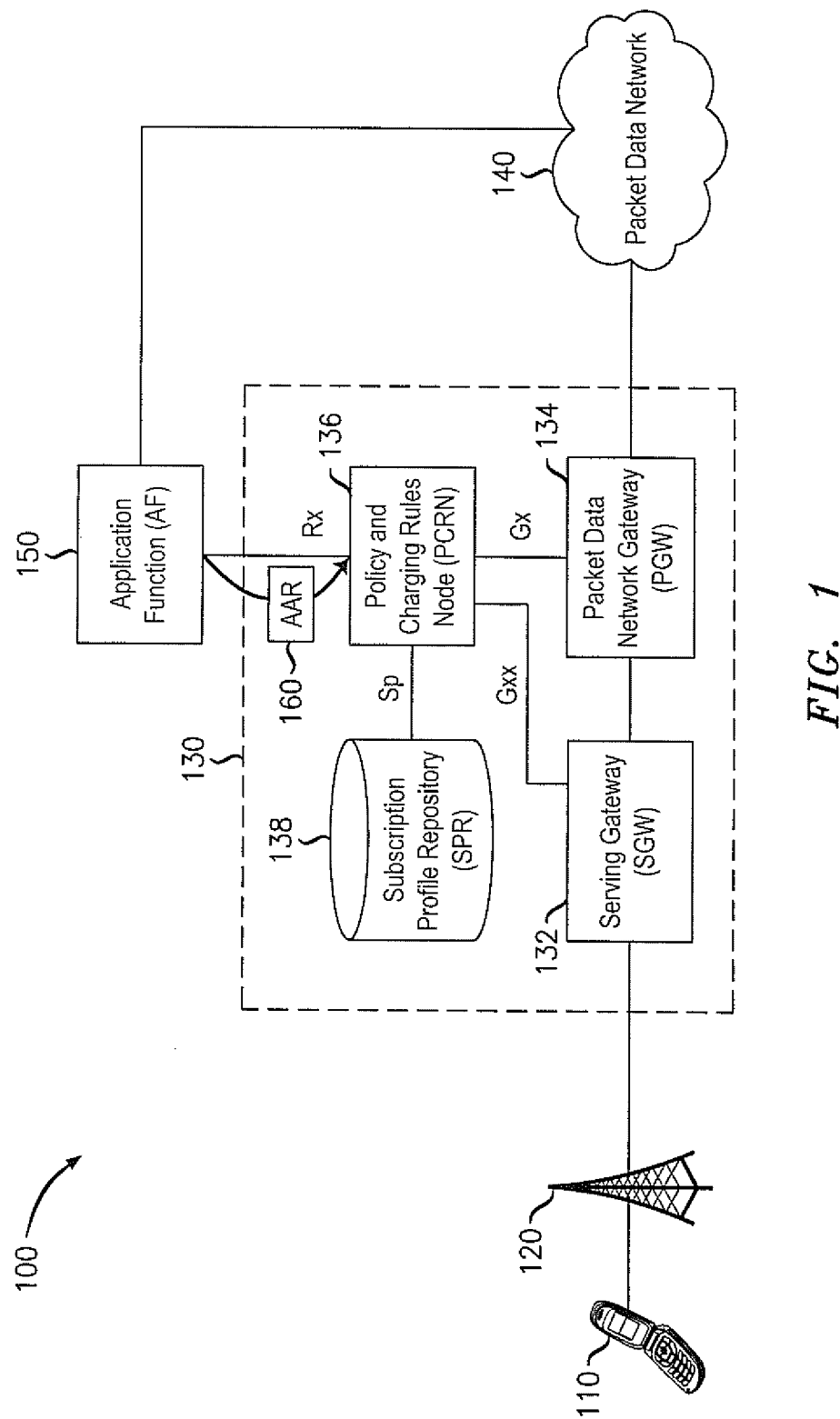
FIG. 1 illustrates an exemplary subscriber network for providing various data services.

In processing the various messages specified by the 3GPP, it may oftentimes be useful to identify a subscriber, IP-CAN session, or other entity associated with the message. Such entities may be identified based on information carried by the message such as, for example, subscription identifiers, IP addresses, and/or access point names (APN). This information, however, may not always be available in the message, however. For example, the 3GPP does not require various accounting and authorization requests (AARs) to carry an APN.

In view of the foregoing, it would be desirable to provide a method of identifying various entities associated with a received message when the message does not include complete identification information. In particular, it would be desirable to provide a method capable of using other, secondary identification information carried by the message to complete the identification information prior to further processing the message.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (POW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of exemplary subscriber network 100 will be described in further detail below in connection with FIGS. 2-8.

In processing AAR 160, PCRN 136 may attempt to identify an IP-CAN session associated with the request. For example, PCRN 136 may attempt to uniquely identify a known IP-CAN session using an IP address and APN associated with the message. However, AAR 160 may not carry any APN, thereby preventing direct identification of the IP-CAN session.

PCRN 136 may proceed by extracting secondary identification information such as, for example, the value of an origin-host AVP, origin-realm AVP, and/or AF-Application-Identifier AVP. The PCRN 136 may then refer to a mapping between this secondary identification information and APNs. From this mapping, the PCRN may determine an APN value associated with the message and proceed to identify the IP-CAN session based on the determined APN value and an IP address carried by the message.

Figure 2:
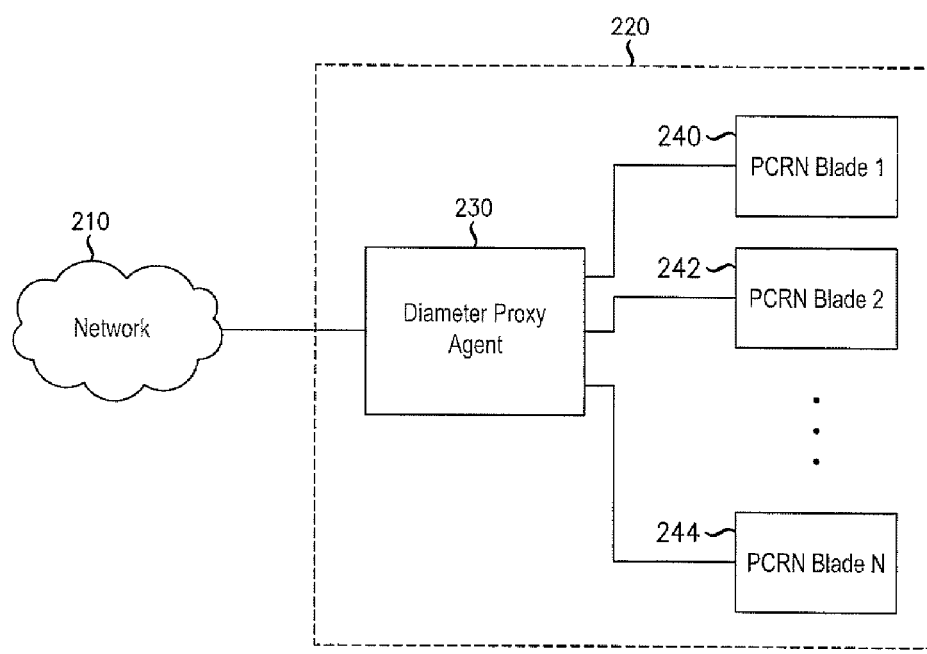
FIG. 2 illustrates an alternative view of the subscriber network of FIG. 1.

FIG. 2 illustrates an alternative view 200 of the subscriber network 100 including an expanded view of a PCRN such as PCRN 136 of FIG. 1. As shown in alternative view 200, exemplary subscriber network 100 may be represented as a network 210 and a policy and charging rules node (PCRN) 220. Network 210 may correspond to one or more devices of exemplary network 100 such as, for example, user equipment 110, PGW 134, and/or AF 150. PCRN 220 may correspond to PCRN 136 of FIG. 1.

To provide scalability and increased processing capacity, PCRN 220 may be organized as a number of separate PCRN blades 240, 242, 244 that communicate with network 210 via a diameter proxy agent (DPA) 230. As such, DPA 230 may act as a message router between network 210 and PCRN blades 240, 242, 244. In various embodiments, DPA 230 may be disposed within the same chassis as PCRN blades 240, 242, 244.

DPA 230 may include a device or group of devices adapted to receive various messages from network 210. For each received message, DPA 230 may identify an appropriate PCRN blade 240, 242, 244 to process the message. For example, in various embodiments, each subscriber may be associated with one PCRN blade 240, 242, 244. In such embodiments, DPA 230 may use information carried by the message to identify a subscriber associated with the message. DPA 230 may then use a subscriber record, such as a record stored in an SPR, to determine a PCRN blade 240, 242, 244 associated with the subscriber. Finally, DPA 230 may forward a message to the associated PCRN blade 240. Various alternative methods of PCRN blade assignment and/or forwarding messages to appropriate PCRN blades will be apparent to those of skill in the art. In various embodiments, DPA 230 may also forward messages received from PCRN Blades 240, 242, 244 to appropriate elements of network 210. In various embodiments, DPA 230 may also directly identify the IP-CAN session and/or subscriber associated with the message or may indirectly identify such entities by inserting additional identifying information into the message.

PCRN 220 may also include a plurality of PCRN blades 240, 242, 244. It should be noted that, while three PCRN blades 240, 242, 244 are illustrated, various embodiments may include fewer or more PCRN blades. Further, the number of PCRN blades 240, 242, 244 may change during operation of PCRN 220. For example, an administrator may remove PCRN blades that are faulty and/or may add new PCRN blades (not shown) to increase the capacity of PCRN 220.

Each PCRN blade 240, 242, 244 may include a complete implementation of a policy and charging rules function (PCRF) as defined by the 3GPP. Each PCRN blade 240, 242, 244 may be implemented on an independent circuit board and may include various hardware components such as processors, main memory, network and/or backplane interfaces, and/or data storage devices. Accordingly, each PCRN blade 240, 242, 244 may be adapted to perform various PCRF functions such as receiving request messages, processing request messages to create policy and charging control (PCC) rules, installing PCC rules at other nodes. In processing messages, it may be useful for a PCRN blade 240, 242, 244 to identify an IP-CAN session and/or subscriber associated with each message using various identification information carried by the message.

Figure 3:
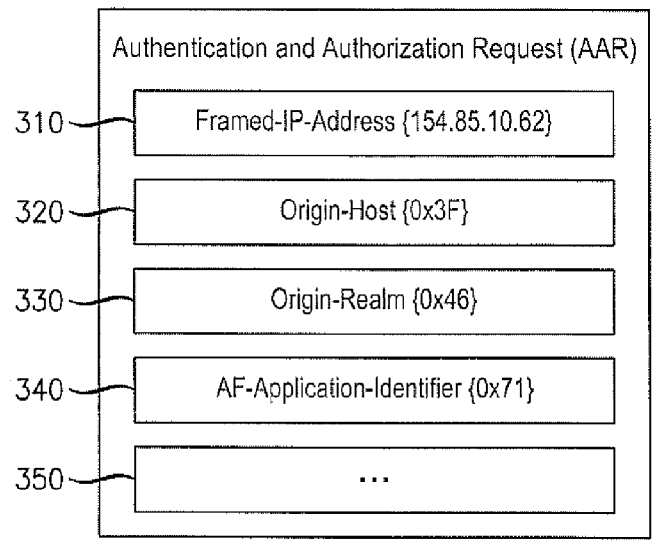
FIG. 3 illustrates an exemplary message received by a PCRN.

FIG. 3 illustrates an exemplary message 300 received by a PCRN. Exemplary message 300 may be an authentication and authorization request (AAR) message received from an AF and constructed according to the Diameter protocol and/or the 3GPP specifications. For example, message 300 may correspond to AAR 160 of FIG. 100. It should be noted that, while various embodiments herein are described as operating with respect to an AAR, the principles described herein may additionally be applicable to other messages such as, for example, a CCR.

AAR 300 may include a number of attribute-value pairs (AVPs) such as framed-IP-address AVP 310, origin-host AVP 320, origin-realm AVP 330, and/or AF-application-identifier AVP 340. AAR 300 may include numerous additional AVPs 350.

Framed-IP-address AVP 310 may specify an IP address for the IP-CAN session associated with the request. This IP address in combination with an APN may be useful in uniquely identifying an IP-CAN session and/or associated subscriber. In various embodiments wherein different portions of the network have overlapping IP address pools, the IP address alone may be insufficient to uniquely identify an IP-CAN session. Because the value of the Framed-IP-address AVP 310 may be used in combination with other information to identify an entity such as an IP-CAN session, the Framed-IP-address AVP 310 may be referred to as a "primary identification AVP" and the value thereof may be referred to as "primary identification value." For similar reasons, information such as an APN or subscription identifiers may also be referred to as "primary identification values." It should also be noted that, while the examples herein reference various IP addresses according to the IPv4 standard, various embodiments may alternatively or additionally utilize IPv6 addresses. Accordingly, AAR 300 may also include a Framed-IPv6-Prefix AVP (not shown). Various additional modifications to enable use of IPv6 addresses will be apparent to those of skill in the art.

Origin host AVP 320 may identify a particular node from which the message originates. For example, in the case of an AAR, origin-host AVP may identify a particular AF that sent the AAR. Origin-realm AVP 330 may identify a realm to which the originating node belongs. AF-application-identifier 340 may include an identifier of the application provided by an originating AF.

In various embodiments, message 300 may not include any AVPs (not shown) indicating other primary identification information such as an APN or subscription identifier. As explained above, the value of framed-IP-address AVP 310 alone may be insufficient to identify an IP-CAN session and/or subscriber associated with the message. As such, message 300 may be said to carry "incomplete primary identification information."

As will be explained in greater detail, below, a PCRN or other device may utilize information such as that carried by origin-host AVP 320, origin-realm AVP 330, and/or AF-application-identifier AVP 340 to determine an APN associated with the message. The PCRN or other device may then, in turn, identify the IP-CAN session and/or subscriber associated with the message using the determined APN along with the IP address carried by framed-IP-address AVP 310. Because origin-host AVP 320, origin-realm AVP 330, and/or AF-application-identifier AVP 340 may be used to determine a primary identification value, these AVPs may be referred to as "secondary identification AVPs" and the values thereof may each be referred to as a "secondary identification value."

Figure 4:
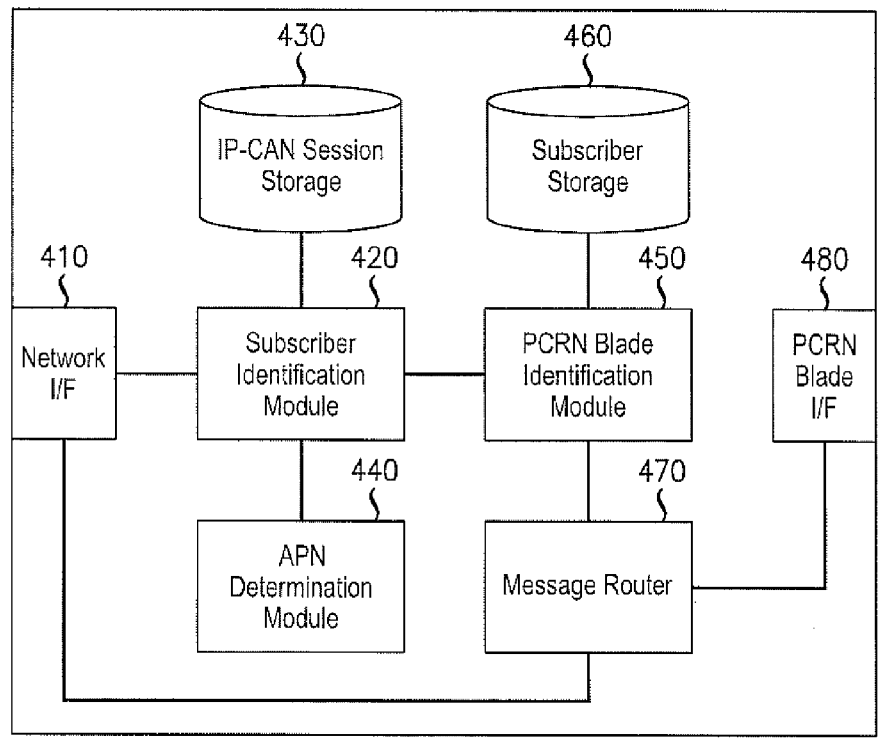
FIG. 4 illustrates an exemplary diameter proxy agent (DPA)

FIG. 4 illustrates an exemplary diameter proxy agent (DPA) 400. Exemplary DPA 400 may correspond to DPA 230 of FIG. 2. DPA 400 may include network interface 410, subscriber identification module 420, IP-CAN session storage 430, APN determination module 440, PCRN blade identification module 450, subscriber storage 460, message router 470, and/or PCRN blade interface 480. It should be noted that exemplary DPA 400 may be, in some respects, a simplification and/or abstraction. As such, various implementations may include additional components (not shown) for providing additional or augmented functionality and various components may be implemented on hardware such as one or more processors, field programmable gate arrays (FPGAs), and/or main memories. Further, various alternative arrangements for achieving the functions detailed herein may be apparent to those of skill in the art.

Network interface 410 may be an interface comprising hardware and/or executable instructions encoded on a machine-readable storage medium configured to communicate with at least one other device such as, for example, a PGW and/or AF. In various embodiments, network interface 410 may be an Ethernet interface. During operation, network interface 410 may receive a request message from another device and forward the message to subscriber identification correlation module 410.

Subscriber identification module 420 may include hardware and/or executable instructions on a machine-readable storage medium configured to identify a subscriber associated with a received message. For example, subscriber identification module 420 may utilize an IP address and APN carried by the message to look up an IP-CAN session stored in IP-CAN session storage 430 and retrieve one or more subscriber identifiers associated with the IP-CAN session. Alternatively, subscriber identification module 420 may simply extract one or more subscriber identifiers from the received message, if present. Subscriber identification module 420 may then pass the message and subscriber identifiers to PCRN blade identification module 450.

In various embodiments, subscriber identification module 420 may receive a message that does not include either a subscription identifier or an APN. More generally, subscriber identification module 420 may receive a message having incomplete primary identification information. In an attempt to complete the primary identification information, subscription identification module 420 may forward the message to one or more primary identification information determination modules. As an example of a primary identification information determination module, DPA 400 includes an APN determination module 440. Upon receiving the missing primary identification information from APN determination module 440 and/or other primary identification information determination modules (not shown), subscriber identification module 420 may proceed in the manner described above.

IP-CAN session storage 430 may be any machine-readable medium capable of storing information related to various IP-CAN sessions known to the DPA 400. Accordingly, IP-CAN session storage 430 may include a machine-readable storage medium such as read-only memory (ROM), random-access memory (RAM), magnetic disk storage media, optical storage media, flash-memory devices, and/or similar storage media. IP-CAN session storage 430 may store a record for each known IP-CAN session along with one or more subscriber identifiers mapped thereto. It will be apparent to those of skill in the art that IP-CAN session storage 430 may include various additional information useful in providing additional functions of DPA 400. In various embodiments, IP-CAN session storage 430 may be a device or group of devices that is external to DPA 400. For example, IP-CAN session storage 430 may be implemented among a number of PCRN blades.

APN determination module 440 may include hardware and/or executable instructions on a machine-readable storage medium configured to receive a message and utilize secondary identification information carried thereby to determine an APN associated with the message. APN determination module 440 may then report the APN back to a requesting module such as, for example, subscriber identification module 420. An exemplary APN determination module 440 will be described in greater detail with respect to FIG. 6.

PCRN blade identification module 450 may include hardware and/or executable instructions on a machine-readable storage medium configured to identify a PCRN blade associated with a subscriber. For example, using one or more subscription identifiers passed by subscriber identification module 420, PCRN blade identification module 450 may refer to a subscriber storage 460 to retrieve a record associated with the subscriber. Such record may, in turn, identify a PCRN blade to which that subscriber is assigned and, consequently, to which the message should be forwarded. PCRN blade identification module 450 may then forward the message and an indication of the appropriate PCRN blade to message router 470.

Subscriber storage 460 may be any machine-readable medium capable of storing information related to various subscribers. Accordingly, subscriber storage 460 may include a machine-readable storage medium such as read-only memory (ROM), random-access memory (RAM), magnetic disk storage media, optical storage media, flash-memory devices, and/or similar storage media. Subscriber storage 460 may store a record for each subscriber along with a PCRN to which each subscriber is assigned. It will be apparent to those of skill in the art that subscriber storage 460 may include various additional information useful in providing additional functions of DPA 400. In various embodiments, subscriber storage 460 may be a device that is external to DPA 400. For example, subscriber storage 460 may be a subscription profile repository (SPR). In various embodiments, subscriber storage may be implemented by the same physical device as IP-CAN session storage 430.

Message router 470 may include hardware and/or executable instructions on a machine-readable storage medium configured to route messages between PCRN blades and other network devices. For example, message router 470 may receive a message and indication of a PCRN blade from PCRN blade identification module 450. Alternatively, message router 470 may receive an indication of a PCRN blade from PCRN blade identification module 450 but may receive the message itself directly from network interface 410. In turn, message router 470 may transmit the message to the identified PCRN blade via PCRN blade interface 480. Message router 470 may also receive messages such as authentication and authorization answers (AAAs) and reauthorization requests (RARs) via PCRN blade interface 480 and route such messages to the appropriate nodes via network interface 410.

PCRN blade interface 480 may be an interface comprising hardware and/or executable instructions encoded on a machine-readable storage medium configured to communicate with one or more PCRN blades. In various embodiments, PCRN blade interface 480 may include an Ethernet, PCI, SCSI, ATA, and/or other hardware interface technologies. In various embodiments, PCRN blade interface 480 may include a blade server backplane. In various embodiments, PCRN blade interface 480 may be the same physical device as network interface 410.

It will be apparent to those of skill in the art that various alternative embodiments may utilize alternative methods to map an incoming message to an appropriate PCRN blade. For example, DPA 400 may include a direct mapping between IP-CAN session identifiers and PCRN blades. In such embodiments, DPA 400 may use primary identification information to identify a different entity; for example, instead of identifying a subscriber and an IP-CAN session, DPA 400 may identify only an IP-CAN session using the primary identification information associated with a received message. As yet another alternative, the primary identification information and/or an IP-CAN session may map directly to a PCRN blade; as such, the identified entity may include an IP-CAN session and/or a PCRN blade. Accordingly, as used herein, the term "entity" will be understood to refer to any entity that may be identified using primary identification information during the normal course of DPA operation. Various modifications to realize such alternative embodiments will be apparent to those of skill in the art.

Figure 5:
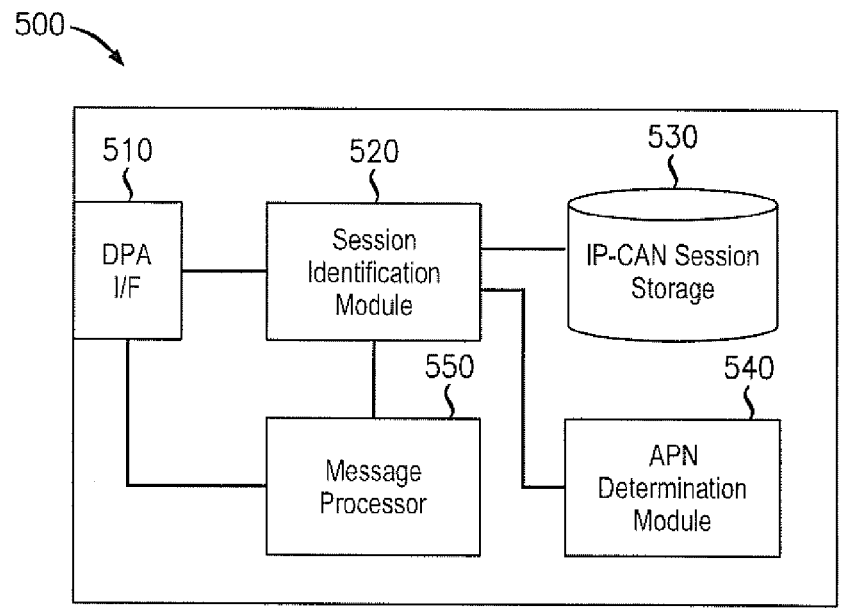
FIG. 5 illustrates an exemplary PCRN blade.

FIG. 5 illustrates an exemplary PCRN blade 500. PCRN blade 500 may correspond to one or more of PCRN blades 240, 242, 244 of FIG. 2. PCRN blade 500 may include DPA interface 510, session identification module 520, IP-CAN session storage 530, APN determination module 540, and/or message processor 550. It should be noted that exemplary PCRN blade 500 may be, in some respects, a simplification and/or abstraction. As such, various implementations may include additional components (not shown) for providing additional or augmented functionality and various components may be implemented on hardware such as one or more processors, field programmable gate arrays (FPGAs), and/or main memories. Further, various alternative arrangements for achieving the functions detailed herein may be apparent to those of skill in the art.

DPA interface 510 may be an interface comprising hardware and/or executable instructions encoded on a machine-readable storage medium configured to communicate with a DPA such as, for example, DPA 230 or 400. In various embodiments, DPA interface 510 may include an Ethernet, PCI, SCSI, ATA, and/or other hardware interface technologies. In various embodiments, DPA interface 510 may include a blade server backplane.

Session identification module 520 may include hardware and/or executable instructions on a machine-readable storage medium configured to identify an IP-CAN session associated with a received message. For example, session identification module 520 may utilize an IP address and APN carried by the message to look up an IP-CAN session stored in IP-CAN session storage 530. Session identification module 520 may then pass the message and an identification of the IP-CAN session to message processor 540.

In various embodiments, session identification module 520 may receive a message that does not include either a subscription identifier or an APN. More generally, session identification module 520 may receive a message having incomplete primary identification information. In an attempt to complete the primary identification information, session identification module 520 may forward the message to one or more primary identification information determination modules. As an example of a primary identification information determination module, PCRN blade 500 includes an APN determination module 540. Upon receiving the missing primary identification information from APN determination module 540 and/or other primary identification information determination modules (not shown), session identification module 520 may proceed in the manner described above.

IP-CAN session storage 530 may be any machine-readable medium capable of storing information related to various IP-CAN sessions known to the PCRN blade 500. Accordingly, IP-CAN session storage 530 may include a machine-readable storage medium such as read-only memory (ROM), random-access memory (RAM), magnetic disk storage media, optical storage media, flash-memory devices, and/or similar storage media. IP-CAN session storage 530 may store a record for each known IP-CAN session along with one or more subscriber identifiers associated therewith. It will be apparent to those of skill in the art that IP-CAN session storage 530 may include various additional information useful in providing additional functions of PCRN blade 500. In various embodiments, IP-CAN session storage 530 may be a device or group of devices that is external to PCRN blade 500. For example, IP-CAN session storage 530 may be implemented on a DPA associated with PCRN blade 500.

APN determination module 540 may include hardware and/or executable instructions on a machine-readable storage medium configured to receive a message and utilize secondary identification information carried thereby to determine an APN associated with the message. APN determination module 540 may then report the APN back to a requesting module such as, for example, session identification module 520. An exemplary APN determination module 540 will be described in greater detail with respect to FIG. 6.

Message processor 550 may include hardware and/or executable instructions on a machine-readable storage medium configured to process a received message in accordance with the 3GPP standards. For example, message processor 550 may receive a request to establish a known application, generate one or more corresponding PCC rules, and transmit the PCC rules to one or more PCENs for implementation via DPA interface 510 or another interface (not shown). Various additional functionalities for realizing the 3GPP specifications will be apparent to those of skill in the art.

It will be apparent to those of skill in the art that various alternative embodiments may utilize alternative methods to map an incoming message to entities useful in processing a message. For example, PCRN blade 500 may alternatively or additionally identify a subscriber associated with the message. Various modifications to realize such alternative embodiments will be apparent to those of skill in the art.

Figure 6:
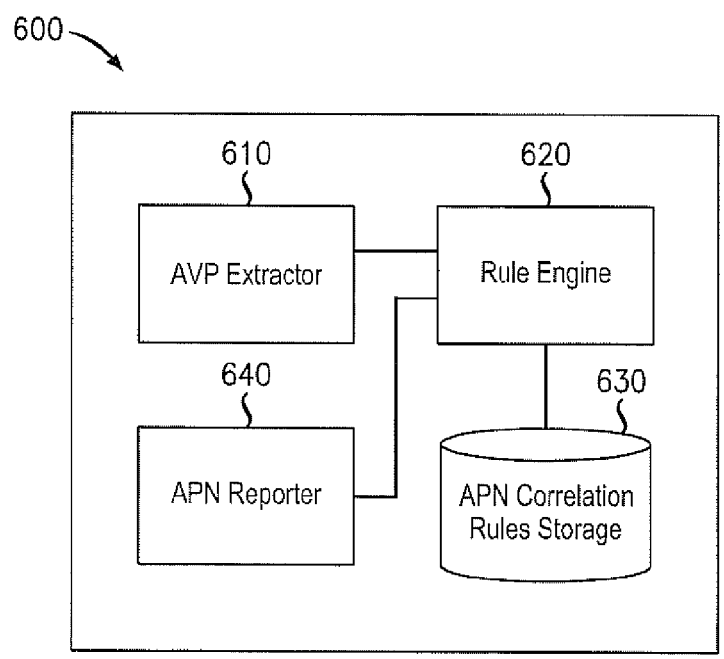
FIG. 6 illustrates an exemplary APN determination module.

FIG. 6 illustrates an exemplary APN determination module 600. APN determination module 600 may correspond to APN determination module 440 of FIG. 4 and/or APN determination module 540 of FIG. 5. APN determination module 540 may include AVP extractor 610, rules engine 620, APN correlation rules storage 630, and/or APN reporter 640. It should be noted that APN determination module 600 may be, in some respects, a simplification and/or abstraction. As such, various implementations may include additional components (not shown) for providing additional or augmented functionality and various components may be implemented on hardware such as one or more processors, field programmable gate arrays (FPGAs), and/or main memories. Further, various alternative arrangements for achieving the functions detailed herein may be apparent to those of skill in the art.

AVP extractor 610 may include hardware and/or executable instructions on a machine-readable storage medium configured to receive a message from another device or system component and extract one or more AVPs from the message. AVP extractor 610 may select one or more AVPs identified as including secondary identification values useful in identifying a primary identification value such as an APN. For example, AVP extractor 610 may extract an origin-host AVP, origin-realm AVP, and/or AF-application-identification AVP. AVP extractor 610 may pass the extracted AVPs to rules engine 620.

Rules engine 620 may include hardware and/or executable instructions on a machine-readable storage medium configured to determine an APN associated with the secondary identification information passed by AVP extractor 610. Rules engine 620 may iterate through a number of correlation rules stored in APN correlation rules storage 630 to find a correlation rule that matches the secondary identification information. As will be described in greater detail below with respect to FIG. 7, each correlation rule may specify criteria that indicate when the correlation rule matches the secondary identification information. Rules engine 620 may then pass an APN specified by the correlation rule to APN reporter 640.

APN correlation rules storage 630 may be any machine-readable medium capable of storing correlation rules. Accordingly, APN correlation rules storage 630 may include a machine-readable storage medium such as read-only memory (ROM), random-access memory (RAM), magnetic disk storage media, optical storage media, flash-memory devices, and/or similar storage media. It will be apparent to those of skill in the art that APN correlation rules storage 630 may include various additional information useful in providing additional functions of APN determination module 600.

In various embodiments, APN correlation rules storage 630 may be a device that is external to APN determination module 600. Exemplary contents of APN correlation rules storage 630 will be described below with respect to FIG. 7.

Various alternative implementations of rules engine 620 and APN correlation rules storage 630 may be apparent to those of skill in the art. For example, APN correlation storage rules storage may simply store a lookup table such as, for example, a hash table or associative array. In such embodiments, rules engine 620 may be configured to generate a hash key and/or identify a lookup table entry as the applicable correlation rule. As yet another alternative, APN correlation rule storage may store a number of APN records that each include one or more criteria that indicate when the APN is applicable to a message and, therefore, serve as correlation rules, In such embodiments, rules engine 620 may be configured to evaluate each criteria set of the APN records to determine whether the secondary identification information matches the APN record. Various additional or alternative implementations will be apparent to those of skill in the art.

APN reporter 640 may include hardware and/or executable instructions on a machine-readable storage medium configured to pass an APN determined by rules engine 620 to an appropriate requesting component or device. In various embodiments, APN reporter 640 may simply forward the APN to a specified component or device. For example, in various implementations wherein only one component may request an APN, APN reporter may automatically forward the APN to that component. In various alternative embodiments wherein multiple components may request an APN from APN determination module 600, APN reporter 640 may determine which component requested the APN and forward the value to that component.

FIG. 7 illustrates an exemplary correlation rule set 700. Correlation rule set 700 may be, for example, a group of tables in a database stored in APN correlation rule storage 630. Alternatively, correlation rule set 700 could be a series of linked lists, an array, or a similar data structure. Thus, it should be apparent that correlation rule set 700 is an abstraction of the underlying data; any data structure suitable for storage of this data may be used.

Each correlation rule in correlation rule set 700 may include a criteria field 710 and a result field 720. Criteria field 710 may indicate one or more conditions that specify when a particular correlation rule is applicable. In various alternative embodiments, criteria field 710 may store a key such as a hash key. Result field 720 may store an APN value to be used when the criteria of criteria field 710 are met.

As an example, correlation rule 732 indicates that if the origin-host AVP has a value of 0x3F, the origin-realm AVP has a value of 0x64, and the AF-application-identifier AVP has a value of 0x4E, an APN of 0x4 should be used in processing the corresponding message. In various embodiments, the criteria fields 710 of each rule may not always use the same AVPs. For example, correlation rule 742 specifies that it is applicable when the origin-realm AVP has a value of 0x46 and the AF-application-identifier AVP has a value of 0x71, but does not specify a value for an origin-host AVP. In various embodiments, it may be assumed that any value of the origin-host AVP matches the criteria of correlation rule 742. For this reason, correlation rule 742 and the criteria thereof may be referred to as "less specific" and "having less specificity" than correlation rule 732 and its criteria.

As illustrated, correlation rule set 700 may include at least five groups of correlation rules having different specificities. A most specific group 730 may include a number of correlation rules 732, 734, 736 that utilize origin-host AVP, origin-realm AVP, and AF-application-identifier AVP. Next, group 740 may include a number of correlation rules 742, 744, 746 that utilize origin-realm AVP, and AF-application-identifier AVP. Group 750 may include a number of correlation rules 752, 754, 756 that utilize an AF-application-identifier AVP. Group 760 may include a number of correlation rules 762, 764, 766 that utilize an origin-realm AVP. Group 770 may include a number of correlation rules 772, 774, 776 that utilize an origin-host AVP and origin-realm AVP. Correlation rule set may include numerous additional groups 780.

In various embodiments, correlation rule set may be at least partially ordered. For example, the groups 730, 740, 750, 760, 770 may be ordered according to descending specificity. As such, a rules engine may evaluate the correlation rules in group 730 before proceeding to group 740. Such an embodiment may enable rules having overlapping criteria; therein, the correlation rule having a most specific match to the available secondary identification information may be the first matching correlation rule encountered and may be selected as the applicable rule. In some such embodiments, the rules within a particular group may not be evaluated according to any particular order.

It should be apparent that various alternative embodiments may utilize alternative AVPs and/or alternative combinations thereof. Further, various alternative embodiments may deem specificity of a criteria set differently. For example, an alternative embodiment may determine that the criteria of group 770 may be more specific than that of group 750 and therefore should be evaluated first. Further, various alternative embodiments may not define groups of specificity and may, instead, impose a full order on the correlation rules. Various modification will be apparent to those of skill in the art.

Figure 8:
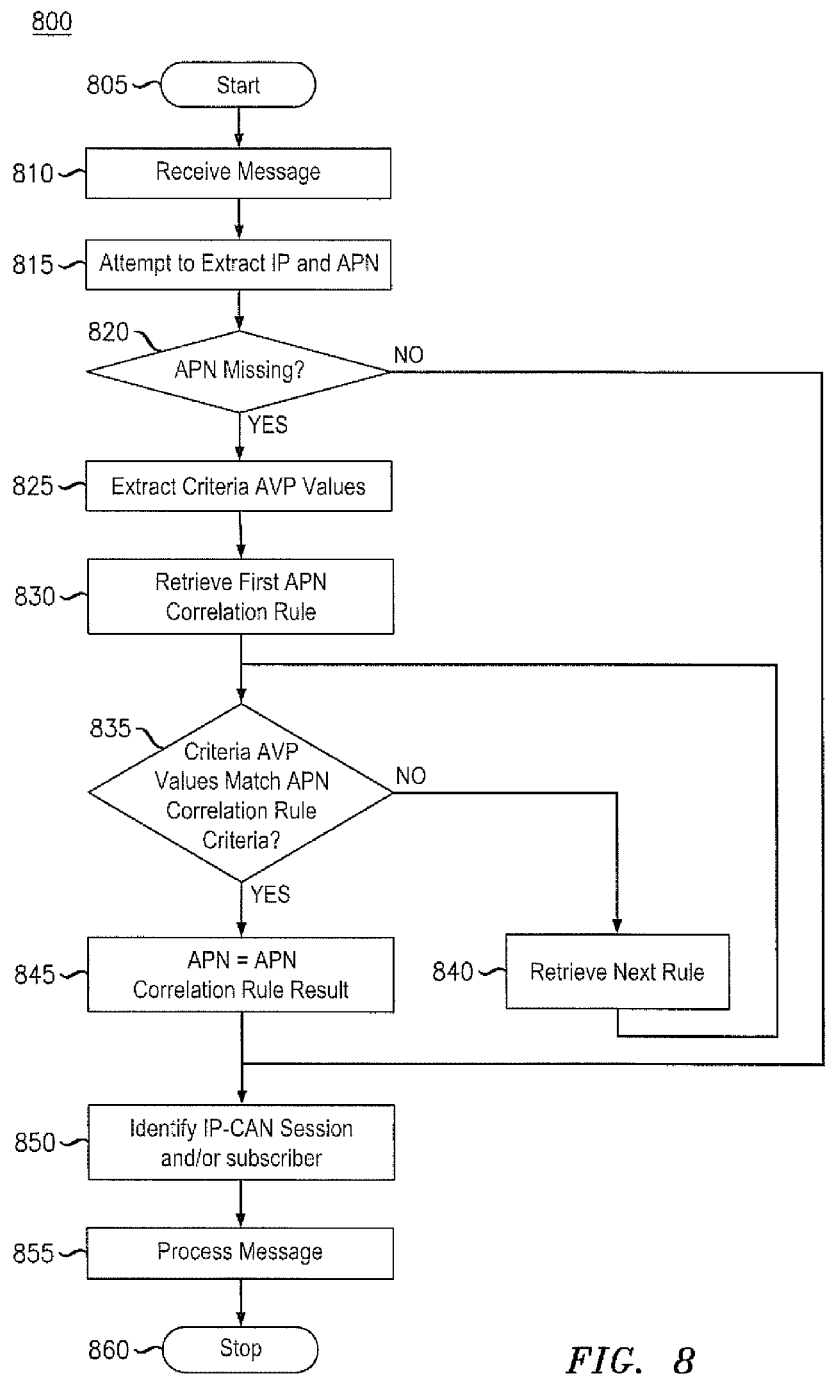
FIG. 8 illustrates an exemplary method for processing a message having incomplete primary identification information.

FIG. 8 illustrates an exemplary method 800 for processing a message having incomplete primary identification information. Method 800 may be performed by the components of DPA 400, PCRN blade 500, and/or APN determination module 600, For the purposes of illustration, however, method 800 will be described as being performed by a "network device[.]"

Method 800 may begin in step 805 and proceed to step 810 where the network device may receive a message. Next, in step 815, the network device may attempt to extract primary identification information, such as an IP address and APN. In step 820, the network device may determine whether the message carried incomplete primary identification information by, for example, determining whether the APN is missing. If the APN is present, method 800 may proceed to step 850. Otherwise, method 800 may proceed to step 825.

In step 825, the network device may extract secondary identification information from AVPs that are to be used as correlation rule criteria. For example, the network device may extract values from an origin-host AVP, origin-realm AVP, and/or AF-application identification AVP. Next, in step 830, the network device may retrieve a first correlation rule and then, in step 835, may determine whether the extracted secondary identification information matches the criteria of the rule. If not, method 800 may proceed to step 840 where the network device may retrieve the next correlation rule to be evaluated. Method 800 may then loop back to step 835.

Once the network device identifies a rule having criteria that matches the extracted secondary identification information, method 800 may proceed from step 835 to step 845. In step 845, the network device may extract a primary identification value such as an APN from the result section of the applicable correlation rule. Then, in step 850, the network device may use the available primary identification information to identify an entity such as, for example, an IP-CAN session and/or a subscriber. Next, in step 855, the network device may continue to process the received message. For example, the network device may forward the message to an appropriate PCRN blade or may create one or more PCC rules in response to the message. Various additional or alternative methods of processing the message will be apparent to those of skill in the art. Method 800 may then proceed to end in step 860.

Having described exemplary components and methods of operation of exemplary subscriber network 100 and PCRN 220, an example of the operation of exemplary subscriber network 100 and PCRN 220 will now be provided with reference to FIGS. 1-8. PCRN 220 may correspond to PCRN 136; message 300 may correspond to AAR 160; DPA 400 may correspond to DPA 230; PCRN blade 500 may correspond to PCRN blades 240, 242, 246; APN determination module 600 may correspond to APN determination modules 440, 540; correlation rule set may indicate the contents of APN correlation rules storage 630; and method 800 may be performed by DPA 230 and PCRN blades 240, 242, 244.

The process may begin when AF 150 transmits AAR 160, 300 to PCRN 136, 200. DPA 230, 400 may first receive the AAR 160, 300 and extract framed-IP-address AVP 310 in step 815 and determine that AAR 160, 300 does not include an indication of an APN in step 820. The subscriber identification module 420 may then forward AAR 160,300 to APN determination module 440,600 to request an APN.

AVP extractor 610 may then extract origin-host AVP 320, origin-realm AVP 330, and AF-application-identifier AVP 340 and pass these values to rules engine 620 in step 825. The rules engine 620, in steps 830-840 may then iterate through correlation rule set 700 to identify a rule matching the extracted secondary identification information. Beginning with correlation rule 732, rules engine may determine that rules 732, 734, and 736 do not match the extracted information. Note that, while the extracted origin-host AVP carries a value which matches part of rule 732, the remaining criteria of that rule do not match the extracted information. Accordingly, rule 732 may not match the secondary identification information.

Eventually, rules engine 620 may evaluate 742 and determine that the criteria here do match the extracted secondary identification information. Accordingly, in step 845, APN reporter 640 may report an APN of 0x1 to subscriber identification module 420. Note that, while other rules such as rules 752, 764 and 774 may also match the extracted secondary identification information, rules engine 620 may identify only the first encountered match: rule 742. As a result of the partial order of correlation rule set 700, this first identified match may also be the most specific criteria match.

Next, in step 850, subscriber identification module may proceed to identify the IP-CAN session and/or subscriber associated with IP address 154.85.10.62 and APN 0x1. Then, DPA 230, 400 may proceed to identify an appropriate PCRN blade 240, 242, 244 and forward the message to that PCRN blade in step 855. Upon receiving the message at PCRN Blade 240, 242, 244, the method 800 may repeat itself. Alternatively, DPA 230, 400 may have inserted the APN into the message before forwarding or may send some other indication of the APN or identified entity or entities.

According to the foregoing, various embodiments enable an identification of various entities associated with a received message when the message does not include complete identification information. By mapping other available information to the missing identification information, various devices may provide a more robust service that is interoperable with various implementations of the 3GPP or other specifications.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for processing a message having incomplete primary identification information, the method comprising:
receiving, at the network device, a message associated with an entity; determining that the message lacks at least one primary identification value used to identify the entity associated with the message;
extracting at least one secondary identification value from the message;
selecting a correlation rule of a plurality of correlation rules that matches the at least one secondary identification value, wherein each correlation rule of the plurality of correlation rules identifies a mapping between secondary identification values and primary identification values;
identifying the at least one primary identification value based on the selected correlation; identifying the entity based on the at least one primary identification value;
wherein the at least one primary identification value includes an access point name (APN); and the at least one secondary identification value includes at least one of an origin host value, an origin realm value, and an application function (AF) application identifier.

2. The method of claim 1, wherein:
the at least one secondary identification value includes a plurality of secondary identification values;
at least two correlation rules of the plurality of correlation rules each match the plurality of secondary identification values; and
the step of selecting a correlation rule of a plurality of correlation rules comprises selecting a correlation rule of the plurality of correlation rules that matches a most specific combination of the plurality of secondary values.

3. The method of claim 1, wherein the plurality of correlation rules is at least partially ordered and the step of selecting a correlation rule of a plurality of correlation rules comprises:
iterating through the plurality of correlation rules based on the at least partial order;
selecting a first correlation that matches the at least one secondary identification value.

4. The method of claim 3, wherein:
the at least one secondary identification value includes a plurality of secondary identification values;
each correlation rule of the plurality of correlation rules specifies at least one criteria value;
each correlation matches the plurality of secondary identification values if each criteria value of the at least one criteria value specified by the correlation matches at least one secondary identification value of the plurality of secondary identification values; and
the at least partial order of the plurality of correlation rules is based on a specificity of the at least one criteria value specified by each correlation of the plurality of correlations.

5. The method of claim 1, further comprising transmitting, to at least one other network device, an indication of the entity associated with the message.

6. The method of claim 1, wherein the entity associated with the message includes at least one of a subscriber and an IP-CAN session.

7. A network device for processing a message having incomplete primary identification information, the network device comprising:
an attribute-value pair (AVP) extractor configured to extract at least one secondary identification AVP from a message received by the network device;
a correlation rules storage that stores a plurality of correlation rules, wherein each correlation rule of the plurality of correlation rules includes a criteria and a result;
a rules engine configured to select a correlation rule including a criteria that matches at least one value carried by the at least one secondary identification AVP; and
a result reporter configured to report to at least one other component of the network device the result of the selected correlation rule;
wherein the result of the selected correlation rule includes an access point name (APN); and the at least one secondary identification AVP includes at least one of an origin-host AVP, an origin-realm AVP, and an AF-application identifier AVP.

8. The network device of claim 7, wherein the network device further comprises:
a policy and charging rules node (PCRN) blade identification module that determines an appropriate PCRN blade to process the message based on the result of the selected correlation rule; and
a message router that forwards the message to the appropriate PCRN blade.

9. The network device of claim 7, further comprising:
an entity identification module that identifies an entity associated with the message based on the result of the selected correlation rule,
wherein the entity includes at least one of a subscriber and an IP-CAN session.

10. The network device of claim 9, further comprising:
a message router configured to transmit an indication of the entity to at least one other network device.

11. The network device of claim 7, wherein:
the plurality of correlation rules are at least partially ordered based on a specificity of the criteria of each correlation rule, and
in selecting a correlation rule, the rules engine is configured to:
iterate through the plurality of correlation rules based on the at least partial order, and
select a first correlation rule having criteria that matches the at least one secondary identification AVP.

12. A tangible and non-transitory machine-readable storage medium encoded with instructions for execution by a network device for processing a message having incomplete primary identification information, the tangible and non-transitory machine-readable storage medium comprising:
instructions for receiving at the network device, a message associated with an entity; instructions for determining that the message lacks at least one primary identification value used to identify the entity associated with the message;
instructions for extracting at least one secondary identification value from the message; instructions for selecting a correlation rule of a plurality of correlation rules that matches the at least one secondary identification value, wherein each correlation rule of the plurality of correlation rules identifies a mapping between secondary identification values and primary identification values;
instructions for identifying the at least one primary identification value based on the selected correlation; instructions for identifying the entity based on the at least one primary identification value;
wherein the at least one primary identification value includes an access point name (APN); and the at least one secondary identification value includes at least one of an origin host value, an origin realm value, and an application function (AF) application identifier.

13. The tangible and non-transitory machine-readable storage medium of claim 12, wherein:
the at least one secondary identification value includes a plurality of secondary identification values;
at least two correlation rules of the plurality of correlation rules each match the plurality of secondary identification values; and
the instructions for selecting a correlation rule of a plurality of correlation rules comprise instructions for selecting a correlation rule of the plurality of correlation rules that matches a most specific combination of the plurality of secondary values.

14. The tangible and non-transitory machine-readable storage medium of claim 12, wherein the plurality of correlation rules is at least partially ordered and the instructions for of selecting a correlation rule of a plurality of correlation rules comprise:
instructions for iterating through the plurality of correlation rules based on the at least partial order;
instructions for selecting a first correlation that matches the at least one secondary identification value.

15. The tangible and non-transitory machine-readable storage medium of claim 14, wherein:
the at least one secondary identification value includes a plurality of secondary identification values;
each correlation rule of the plurality of correlation rules specifies at least one criteria value;

each correlation matches the plurality of secondary identification values if each criteria value of the at least one criteria value specified by the correlation matches at least one secondary identification value of the plurality of secondary identification values; and the at least partial order of the plurality of correlation rules is based on a specificity of the at least one criteria value specified by each correlation of the plurality of correlations.

16. The tangible and non-transitory machine-readable storage medium of claim 12, further comprising instructions for transmitting, to at least one other network device, an indication of the entity associated with the message.

17. The tangible and non-transitory machine-readable storage medium of claim 12, wherein the entity associated with the message includes at least one of a subscriber and an IP-CAN session.

* * * * *